United States Patent [19]

Elings

[11] Patent Number: 5,081,390
[45] Date of Patent: Jan. 14, 1992

[54] METHOD OF OPERATING A SCANNING PROBE MICROSCOPE TO IMPROVE DRIFT CHARACTERISTICS

[75] Inventor: Virgil B. Elings, Santa Barbara, Calif.

[73] Assignee: Digital Instruments, Inc., Santa Barbara, Calif.

[21] Appl. No.: 565,713

[22] Filed: Aug. 13, 1990

[51] Int. Cl.$^5$ .............................................. H01L 41/08
[52] U.S. Cl. .................................... 310/328; 310/317; 318/116
[58] Field of Search ................ 310/328, 317; 318/116

[56] References Cited

U.S. PATENT DOCUMENTS

| 3,957,162 | 5/1976 | Söderquist | 310/328 |
| 4,925,139 | 5/1990 | McCord | 248/179 |
| 4,939,401 | 7/1990 | Farral | 310/317 |
| 5,038,322 | 8/1991 | Van Loenen | 365/114 |

FOREIGN PATENT DOCUMENTS

| 0137982 | 10/1979 | German Democratic Rep. | 310/317 |
| 0058482 | 3/1986 | Japan | 310/37 |
| 0046787 | 2/1988 | Japan | 310/317 |

Primary Examiner—Mark O. Budd
Assistant Examiner—Thomas M. Dougherty
Attorney, Agent, or Firm—Donald A. Streck

[57] ABSTRACT

The invention is a method for operating a Scanning Probe Microscope (SPM) to provide the capability to eliminate the scanner drift that occurs after the scan area is offset within the range of the scanner. The method disclosed comprises applying an offset that is larger than the desired one and then reducing the offset back to the desired value for scanning. The technique has been found to produce good results for both large and small scans.

13 Claims, 1 Drawing Sheet

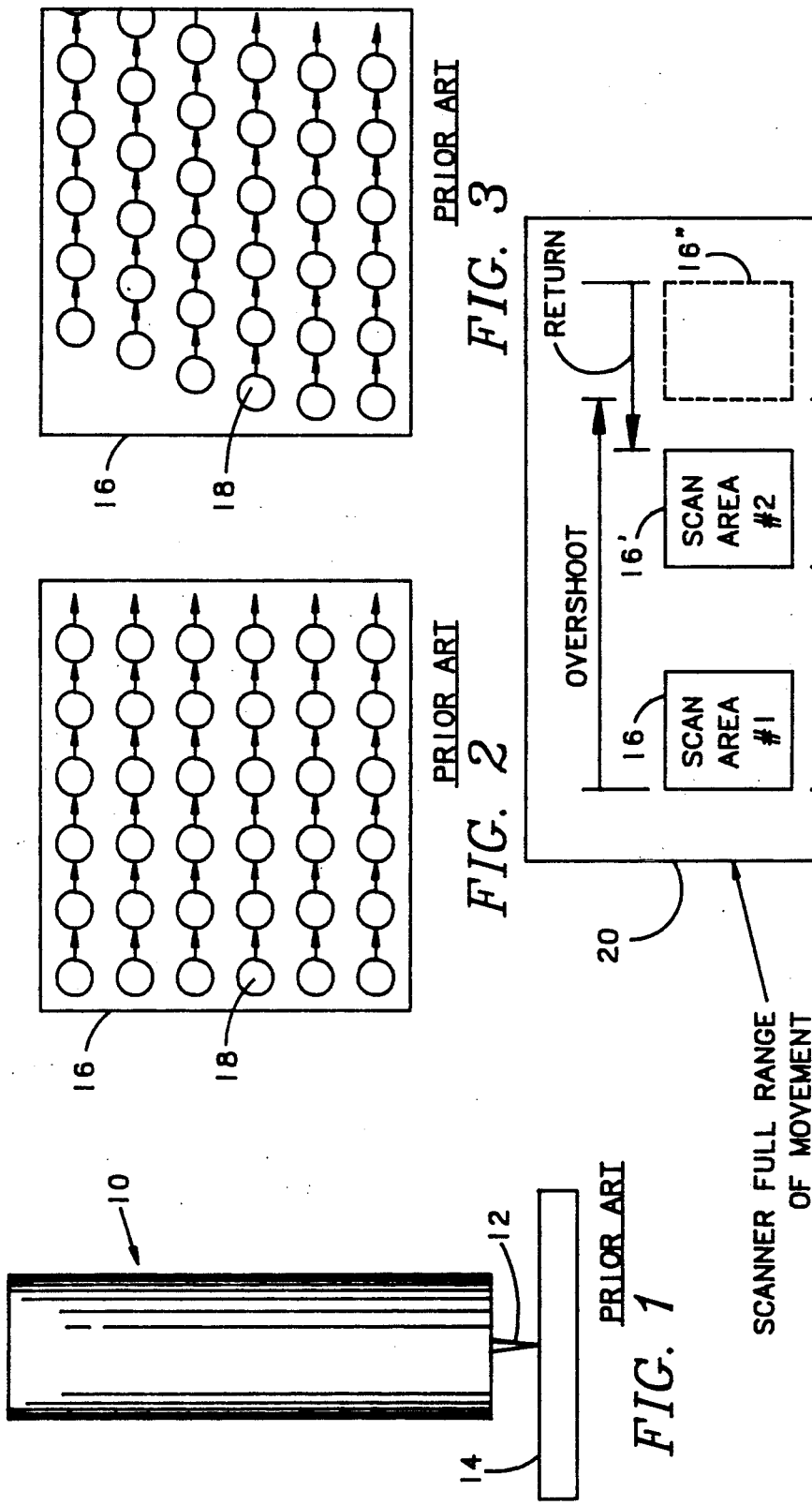

METHOD OF OPERATING A SCANNING PROBE MICROSCOPE TO IMPROVE DRIFT CHARACTERISTICS

BACKGROUND OF THE INVENTION

This invention is related to Scanning Probe Microscopes (SPMs), and in particular, to SPMs with piezoelectric scanners. More particularly, it is related to the method of operating a piezoelectric scanner having drift characteristics in a device wherein the scanner has an end portion moved between laterally displaced first and second positions whereby to minimize effects of scanner's drift comprising the steps of, applying a voltage to the piezoelectric scanner to move the scanner end portion from the first position towards the second position; further applying a voltage to the piezoelectric scanner to cause the scanner end portion to overshoot the second position and move to a third position beyond the second position; and, applying a voltage to the piezoelectric scanner which will return the scanner end portion from the third position to the second position.

Scanning Probe Microscopes are instruments that provide high resolution information about the properties of surfaces. One common use of these devices is imaging, and some types of SPM have the capability of imaging individual atoms. Along with images, SPMs can be used to measure a variety of surface properties, with detail over the range from a few angstroms to hundreds of microns. For many applications, SPMs can provide lateral and vertical resolution that is not obtainable from any other type of device.

The first type of SPM developed was the Scanning Tunneling Microscope (STM). The STM places a sharp, conducting tip near a surface. The surface is biased at a potential relative to the tip. When the tip is brought near the surface, a current will flow in the tip due to the tunneling effect. Tunneling will occur between the atom closest to the surface in the tip and the atoms on the surface. This current is a function of the distance between the tip and the surface, and typically the tip has to be within 20 angstroms of the surface for measurable current to be present. An STM has a mechanism to scan the tip over the surface, typically in a raster pattern. While the tip is scanned over the surface, the tip is kept at a constant distance above surface features by means of a feedback loop between the tunneling current and a vertical position controlling mechanism. The feedback loop adjusts the vertical position of the tip to keep the tunneling current, and thus the distance, constant. The vertical position of the tip is determined from the control signals applied to the vertical position controlling mechanism. The vertical position, as a function of horizontal scan position, produces a topographic map of the surface. Such a device is described in U.S. Pat. No. 4,343,993 by Binnig et al. STMs can easily image individual atoms, and can also be used for highly accurate surface measurements of larger scale, up to a few hundred microns. STMs also may be used for data other than topographic images. One alternative operation of an STM is to hold the tip stationary while varying the bias voltage applied to the sample and monitor the tunneling current, thus measuring local current/voltage characteristics of the surface. STMs require a conducting sample surface for operation; however, insulating surfaces may be coated with a thin conducting material such as gold, or in some cases, insulating materials a few molecules thick lying on a conducting surface may be imaged.

Another SPM, the Atomic Force Microscope (AFM), similarly scans a tip across a surface. The tip in this case, is mounted on the free end of a lever or cantilever, which is fixed at the other end. The tip is brought to a surface, such that the force interaction of the tip with the surface causes the cantilever to deflect. With a feedback loop between the cantilever deflection information and the tip, or sample, vertical position can be used to adjust the vertical position of the tip as it is scanned. The feedback loop keeps the deflection, and thus the force, constant. The tip vertical position versus horizontal scan provides the topographic surface map. In this mode, the forces on the surface can be made very small; so small as not to deform biological molecules. AFMs can also be operated in a mode where the repulsive force deflects the cantilever as it scans the surface. The deflection of the tip as it is scanned provides topographic information about the surface. AFMs may also be operated in a non-contact mode where, typically, some means is used to vibrate the cantilever whereby the Van der Waals interaction between the tip and surface can affect the vibration amplitude. AFMs have a means to detect the small movements of the cantilever. Several such means for cantilever motion detection have been used, with the most common method employing refected light from the cantilever. The deflection of a light beam due to the cantilever motion may be detected, or the movement of the cantilever can be used to generate interference effects which can be used to derive the motion. Like an STM, AFMs can image individual atoms; but, unlike an STM, AFMs can be used for non-conducting surfaces. AFMs may also be used for measurements such as surface stiffness.

Other SPMs may use different probing mechanisms to measure properties of surfaces. Probing devices have been developed for such properties as electric field, magnetic field, photon excitation, capacitance, and ionic conductance. Whatever the probing mechanism, most SPMs have common characteristics, typically operating on an interaction between probe and surface that is confined to a very small lateral area and is extremely sensitive to vertical position. Most SPMs possess the ability to position a probe very accurately in three dimensions and use high performance feedback systems to control the motion of the probe relative to the surface.

The positioning and scanning of the probe relative to the surface of the sample in such devices is usually accomplished with piezoelectric devices such as the piezoelectric scan tube type scanner 10 depicted in FIG. 1. The scanner 10 can be used to scan the probe 12 relative to a sample 14 as depicted; or, can be used to scan the sample 14 relative to a fixed probe. These devices expand or contract when a voltage is applied to them and, typically, have sensitivities of a few angstroms to hundreds of angstroms per volt. Piezoelectric tubes like tube 10 of FIG. 1 have been found to be the best scanning mechanism for most applications. These tubes are capable of generating three dimensional scans. They are mechanically very stiff, have good frequency response for fast scans, and are relatively inexpensive to manufacture and assemble. Such scanners are used in the commercial STMs and AFMs sold by the assignee of this application, Digital Instruments Inc., under the tradename NanoScope. The scanners are made in various lengths, the longer ones having larger scan ranges.

While the invention as described hereinafter is directed to an SPM employing a piezoelectric tube scanner 10 scanning the probe 12, those skilled in the art will readily recognize and appreciate that the novel techniques described hereafter can be used with various types of scanners employing piezoelectric material or other materials exhibiting similar drift problems.

The ability of piezoelectric materials to produce controlled incremental movements of very small size is critical to the operation of SPMs, as no other positioning devices exist with adequate resolution, response time, or controllability. On the other hand, however, piezoelectric materials, although they make SPMS possible, do not have wholly ideal performance characteristics. The actual performance characteristics of these materials can have a significant effect on the performance of the devices into which they are incorporated.

Two sources of error that affect SPM scanners are well known in the art. One is hysterisis and the other is creep. Piezoelectric materials have the property that the amount of expansion for a given applied voltage is dependent on whether the previous applied voltage was higher or lower. Generally, these devices have expansion versus applied voltage characteristics that do not follow the same curve for increasing voltage as for decreasing voltage. Thus, their behavior follows a hysterisis curve. The other error source is piezoelectric creep; that is, piezoelectric materials continue to expand or contract at a decreasing rate in the same direction as the last applied change. Other contributions to non-linear behavior may exist depending on the scan drive waveform characteristics.

The effects of piezoelectric non-linearity are the subject of a considerable amount of attention in the SPM field. Correcting the lateral scan motions (x, y), lessening the effects on the vertical (z) direction, and compensating for long term scanner drift have been described in previous disclosures by the inventor herein. Since the behavior of the piezoelectric scanners is complex, each of these corrections or compensations usually solves only one specific problem. Other scanner behavior characteristics remain to be addressed. Of course, each non-desirable scanner behavior that can be corrected will increase SPM performance and ease of use. As performance and utility increase, SPMs are finding applications as industrial tools as well as research devices, and must be capable of accurate repeatable measurements that can be made with little operator interaction.

One undesirable and previously uncorrected piezoelectric scanner behavior that can seriously affect SPM performance is the very large creep that occurs after a scan area is offset. The problem and the environment which creates it are depicted in FIGS. 2 and 3. Often, data is acquired with an SPM from scan areas 16 that are much smaller than the full range of the scanner. FIG. 2 shows a scan area 16 to be scanned after the probe 12 has been offset in the x direction such as by the application of an offsetting voltage to the scanner 10 of FIG. 1. The scanning beings at the top of the scan area. If there were no drift, the image created from the data gathered at the data gathering points 18 would appear as in FIG. 2; that is, the data gathering points 18 would show no distortion. A typical mode of operation is to cover a large sample area with a series of small, high resolution scans wherein the scan area 16 is moved over the sample 14 by applying offset voltages to the scanner 10. When this offset move of the scanner 10 takes place, the scanner 10 will continue to drift or creep in the same direction as the offset motion. The actual image one would see, therefore is as depicted in FIG. 3 and shows a decaying drift motion in the x direction such that the distortion caused by the drift decreases from the top of the image to the bottom. Also, since the distortion has the effect of displacing objects that should or should not be in the desired scan area, the effect cannot be corrected for after the data is collected. The scan will drift considerably, particularly over the first few seconds after the move. Since the typical scan times for larger scals images ($\geq$ 10 microns square) is a few minutes, this effect will cause a skewing or curving of the image while the drift motion decays. For atomic scale images, which are acquired in a few seconds, the skewing effect can continue for several images. This effect renders images essentially unusable after an offset, until the drift motion has decayed to a negligible value. For larger scale images, which would be typical of an industrial application, such as integrated circuits or storage media, it would be advantageous to have more automated measurement capability. The drift effect is dependent on the size of the offset and can be extremely inconvenient for larger scan areas because the first image, which can take minutes to acquire, will be distorted. The current method to account for the offset drift is to simply wait until the images are visibly undistorted before acquiring data. This approach is unsatisfactory for many applications, especially automated applications where there is no operator to check that the drift has decreased. It would be very desirable for an SPM to move the scan area with little resultant drift, such that data could be collected immediately.

Wherefore, it is the object of this invention to provide a method of operating a piezoelectric scanner, or the like, to prevent drift distortion as described above.

Other objects and benefits of the invention will become apparent from the detailed description which follows hereinafter when taken in conjunction with the drawing figures which accompany it.

SUMMARY OF THE INVENTION

The foregoing object has been achieved in a device wherein a scanner with drift characteristics has a portion which is moved between laterally displaced first and second positions, by the method of operation of the present invention for minimizing effects of scanner drift comprising the steps of, first moving the scanner portion from the first position to and past the second position to a third position beyond the second position in the same direction from the first position; and, then moving the scanner portion from the third position to the second position.

The preferred method additionally comprises the step of holding the scanner portion at the third position for a delay period before the step of moving the scanner portion from the third position to the second position. The step of holding the scanner portion at the third position for a delay period preferably comprises holding the scanner portion at the third position for the time of at least one scan line of a scan pattern being used to scan at the first and second positions.

DESCRIPTION OF THE DRAWINGS

FIG. 1 is a simplified drawing of a piezoelectric scanner of the type wherein the present invention is particularly useful.

FIG. 2 is an illustration of a scan pattern comprising a plurality of data gathering points of a raster scan in a scan area following an offset thereof if there is no drift effect present.

FIG. 3 is an illustration of a scan pattern comprising a plurality of data gathering points of a raster scan in a scan area following an offset thereof when drift effect is present.

FIG. 4 is an illustration of the overshoot method of correcting drift of the present invention.

DESCRIPTION OF THE PREFERRED EMBODIMENT

The present invention is a method of operation which eliminates (or at the very least substantially minimizes) the drift in the image that occurs when the scan area is offset. The method is illustrated in FIG. 4. Given that a scan area 16, that is smaller than the scanner full range of movement as depicted by the box 20, is to be moved to another region of the sample 14. As depicted in the drawing, "SCAN AREA #1" is to be moved to "SCAN AREA #2".

The inventor herein found through experimentation that the drift effect could be dramatically decreased (and in many cases virtually eliminated) by the technique depicted in FIG. 4; that is to offset the scanner 10 farther in the same direction than the actual desired offset location and then move the scanner back to the desired position. This sequence of motions was found to significantly reduces the drift during the scanning of the first image at the new position. Thus, as depicted in FIG. 4, SCAN AREA #1 16 is moved past the desired position of SCAN AREA #2 16' to the overshoot position shown ghosted as 16''. The offset voltage to the scanner 10 is then reduced in the x direction to return the probe 10 to the desired position of SCAN AREA #2 16' from the overshoot position 16''.

Further reduction of the drift has been obtained by leaving the scanner in the overshoot position with the scanner executing at the overshoot position a few scanlines before returning the scan area to the desired position. Of course as those skilled in the art will readily recognize and appreciate, the above-described techniques of this invention can be implemented automatically such that, for each offset of the scan area, the SPM can automatically overshoot, dwell, and then return to the desired position without additional operator intervention.

The inventor hereof has found that overshooting by fifty percent of the desired offset can reduce the drift by an order of magnitude. By matching the amount of overshoot and the dwell time at the overshoot position, the drift can be minimized for any particular piezoelectric material. This method has also been found to decrease drift in cases where the probe is not being scanned but is just being moved from one position to another. For example, the above-described method of this invention might be used to good advantage in a scanning tunneling microscope where one might be measuring voltage current curves at different points and cannot tolerate drift when the probe is moved from point to point.

Wherefore, having thus described my invention, what is claimed is:

1. In a device wherein a piezoelectric scanner with drift characteristics has a portion which is moved between laterally displaced first and second positions, the method of operation to minimize effects of piezoelectric scanner drift comprising the steps of:
    a) first moving the piezoelectric scanner portion from the first position to and past the second position to a third position beyond the second position in the same direction from the first position; and,
    b) then moving the piezoelectric scanner portion from the third position to the second position.

2. The method of claim 1 and additionally comprising the step of:
    holding the piezoelectric scanner portion at the third position for a delay period before said step of moving the piezoelectric scanner portion from the third position to the second position.

3. The method of claim 2 wherein said step of holding the piezoelectric scanner portion at the third position for a delay period comprises:
    holding the piezoelectric scanner portion at the third position for the time of at least one scan line of a scan pattern being used to scan at the first and second positions.

4. The method of claim 2 and additionally including the step of:
    adjusting the distance of the third position beyond the second position and the delay period in combination to produce minimal drift.

5. The method of claim 1 wherein:
    said step of first moving the piezoelectric scanner portion from the first position to and past the second position to a third position beyond the second position in the same direction from the first position comprises moving the piezoelectric scanner portion to a third position which is a distance past the second position equal to at least fifty percent of the distance from the first position to the second position.

6. In a device wherein a piezoelectric scanner with drift characteristics has a portion which is moved between laterally displaced first and second positions, the method of operation to minimize effects of piezoelectric scanner drift comprising the steps of:
    a) moving the piezoelectric scanner portion from the first position towards the second position;
    b) continuing to move the piezoelectric scanner portion overshooting the second position to a third position beyond the second position; and,
    c) returning the piezoelectric scanner portion from the third position to the second position.

7. The method of claim 6 and additionally comprising the step of:
    holding the piezoelectric scanner portion at the third position for a delay period before said step of returning the piezoelectric scanner portion from the third position to the second position.

8. The method of claim 7 wherein said step of holding the piezoelectric scanner portion at the third position for a delay period comprises:
    holding the piezoelectric scanner portion at the third position for the time of at least one scan line of a scan pattern being used to scan at the first and second positions.

9. The method of claim 7 and additionally including the step of:
    adjusting the distance of the third position beyond the second position and the delay period in combination to produce minimal drift.

10. The method of claim 6 wherein:

said step of continuing to move the piezoelectric scanner portion overshooting the second position to a third position beyond the second position comprises moving the piezoelectric scanner portion to a third position which is a distance past the second position equal to at least fifty percent of the distance from the first position to the second position.

11. The method of operating a piezoelectric scanner having drift characteristics in a device wherein the scanner has an end portion moved between laterally displaced first and seconds positions whereby to minimize effects of scanner's drift comprising the steps of:
  a) applying a voltage to the piezoelectric scanner to move the scanner end portion from the first position towards the second position;
  b) further applying a voltage to the piezoelectric scanner to cause the scanner end portion to overshoot the second position and move to a third position beyond the second position; and,
  c) applying a voltage to the piezoelectric scanner which will return the scanner end portion from the third position to the second position.

12. The method of claim 11 and additionally comprising the step of:
  applying a voltage to the piezoelectric scanner which will hold the scanner end portion at the third position for a delay period before returning the scanner end portion from the third position to the second position.

13. The method of claim 12 wherein said step of applying a voltage to the piezoelectric scanner which will hold the scanner end portion at the third position for a delay period additionally comprises:
  continuing to scan the scanner during the delay period in a pattern similar to the scanning at the first and second positions.

* * * * *